July 24, 1956  J. R. BOURNE  2,755,635
ABSORPTION REFRIGERATION SYSTEM, INCLUDING
PREHEATER FOR WEAK SOLUTION
Filed April 16, 1953
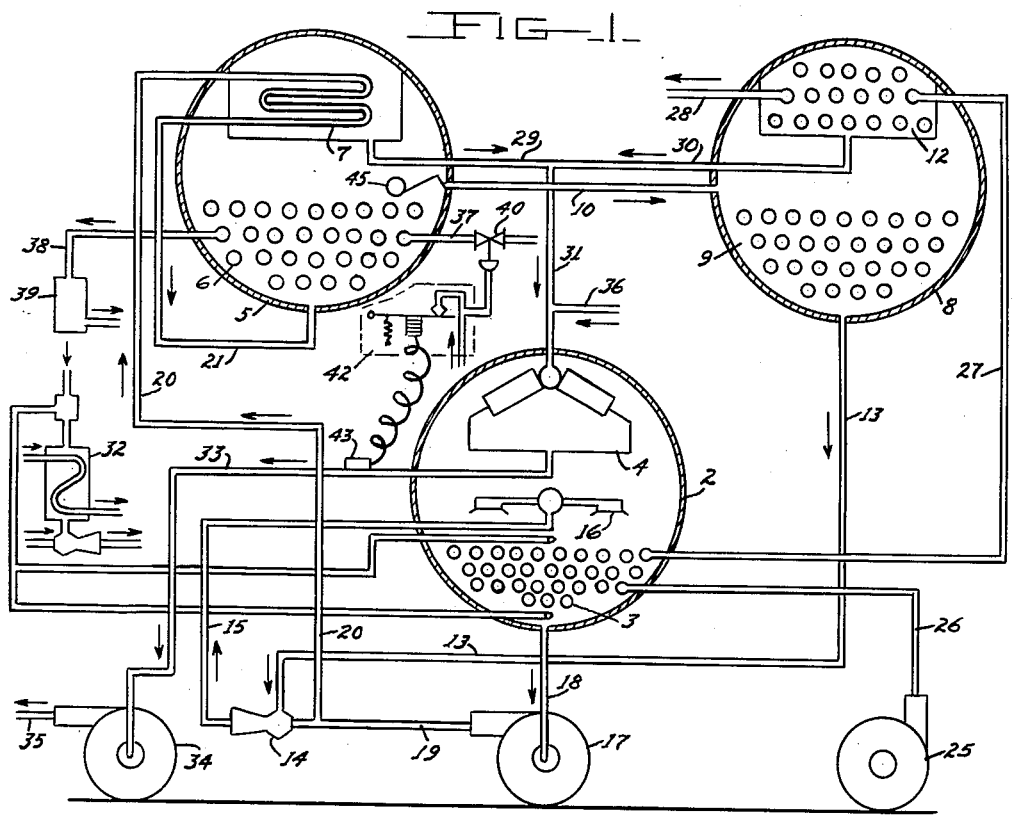
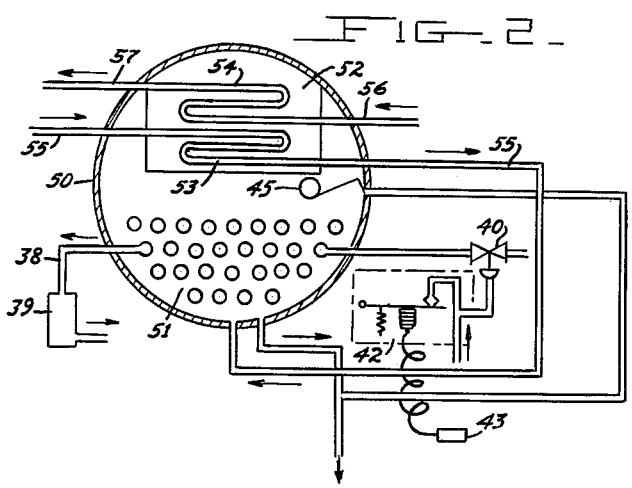
INVENTOR.
Joseph R. Bourne
BY

United States Patent Office 2,755,635
Patented July 24, 1956

2,755,635

ABSORPTION REFRIGERATION SYSTEM, INCLUDING PREHEATER FOR WEAK SOLUTION

Joseph R. Bourne, Syracuse, N. Y., assignor to Carrier Corporation, Syracuse, N. Y., a corporation of Delaware Application April 16, 1953, Serial No. 349,264

14 Claims. (Cl. 62—5)

This invention relates to absorption refrigeration systems and, more particularly, to an absorption refrigeration system in which weak solution is preheated prior to its passage to a generator by being placed in heat exchange relation with refrigerant vapor in the condenser.

The chief object of the present invention is to provide an absorption refrigeration system in which weak solution is preheated prior to its passage to the generator.

An object of the invention is to provide an absorption refrigeration system in which weak solution is placed in heat exchange relation with refrigerant vapor to preheat the weak solution and to condense the vapor.

A further object is to provide an absorption refrigeration system in which weak solution and refrigerant vapor are placed in heat exchange relation, operation of the system being regulated by a simple control mechanism responsive to temperature of refrigerant leaving the evaporator. Other objects of the invention will be readily perceived from the following description.

This invention relates to an absorption refrigeration system which comprises in combination an absorber, an evaporator, a generator and a condenser, means for forwarding weak solution from the absorber to the generator and for forwarding strong solution from the generator to the absorber, and means for passing weak solution from the absorber in heat exchange relation with refrigerant vapor in the condenser prior to its passage to the generator.

This invention further relates to a method of operation of an absorption refrigeration system including an absorber, an evaporator, a generator and a condenser in which the steps consist in passing weak solution from the absorber to the generator and strong solution from the generator to the absorber, and passing weak solution from the absorber in heat exchange relation with refrigerant in the condenser prior to the passage of the weak solution to the generator to preheat the same.

The attached drawing illustrates a preferred embodiment of the invention, in which Figure 1 is a diagrammatic view of an absorption refrigeration system including the present invention; and Figure 2 is a fragmentary diagrammatic view of a modification of the invention shown in Figure 1.

Referring to the attached drawing, there is shown a shell 2 in which is placed a coil 3 which cooperates with the shell to form an absorber. A pan-like member 4 is placed in shell 2 above coil 3 and cooperates with the shell to form an evaporator. A second shell 5 is provided which includes a coil 6 in its lower portion. Coil 6 cooperates with shell 5 to form the first stage of a generator. A coil 7 is placed in shell 5 above generator 6. Coil 7 cooperates with shell 5 to form the first stage of a condenser.

While various combinations of refrigerant and absorber may be employed in the system, it is preferred to employ a solution of water and lithium bromide as the absorber and water as the refrigerant.

The term "weak solution" is used herein to define a solution weak in absorbing power. The term "strong solution" is used herein to define a solution strong in absorbing power.

A third shell 8 includes a generator 9 in its lower portion which serves as a second stage. The second stage of the generator 9 is connected to the first stage 6 of the generator by a line 10. A second coil 12 is provided in shell 8 which serves as the second stage of the condenser. Strong solution is withdrawn from the second stage 9 of the generator through line 13 to ejector 14 which forwards a mixture of strong and weak solution through line 15 to sprays 16 of absorber 3.

Weak solution is drawn from absorber 3 by pump 17 through line 18. A portion of the weak solution drawn from absorber 3 by pump 17 is forwarded to ejector 14. The discharge of the weak solution in ejector 14 entrains strong solution from line 13, the mixture being forwarded to absorber 3 through line 15 as previously described.

Pump 17 forwards weak solution through line 19 and line 20 to coil 7 forming the first stage of the condenser. In coil 7 the weak solution is placed in heat exchange relation with refrigerant vapor boiled off by the first stage of the generator thereby preheating the weak solution and condensing the refrigerant vapor.

The preheated weak solution passes from coil 7 through line 21 to the first stage 6 of the generator. In the first stage of the generator the weak solution is heated, refrigerant vapor boiling off from the solution and passing to the first stage of the condenser. The solution remaining then passes through line 10 to the second stage 9 of the generator. Since the shells 5 and 8 are maintained at different pressures, refrigerant flashes from the solution in the second stage, the flashed refrigerant vapor passing to the second stage of the condenser 12 while the strong solution passes through line 13 to the absorber as described above.

A pump 25 passes cooling water through line 26 to the absorber 3 and then forwards the water after its passage through the absorber 3 through line 27 to the second stage 12 of the condenser, leaving the second stage 12 through line 28.

A line 29 is used to withdraw refrigerant vapor condensate from the first stage 7 of the condenser. A second line 30 is used to remove refrigerant vapor condensate from the second stage 12 of the condenser. Lines 29, 30 join line 31 which returns the condensate to evaporator 4. These lines are sized to maintain a predetermined pressure difference between the evaporator and the stages of the condenser; if desired, a suitable trap arrangement may be employed.

A suitable purge arrangement 32 is provided to purge the absorber of non-condensible gases. It will be understood the non-condensible gases pass from the various stages of the condenser to shell 2 through lines 29, 30 and 31 collecting in the absorber 3.

Chilled water provided by the system is withdrawn from evaporator 4 through line 33 by pump 34, pump 34 circulating the chilled water through line 35 to a place of use such as an air conditioning system (not shown). The water is returned to evaporator 4 through line 36. The returned water and condensate is sprayed in evaporator 4 being flash-cooled. The flashed vapor passes downward about member 4 being absorbed by solution in absorber 3 while the chilled water is withdrawn from the evaporator, as previously described.

As illustrated in the drawing, steam is employed as a heating medium for the first stage 6 of the generator. The heating medium is supplied to coil 6 through line 37. Condensate leaves coil 6 through line 38, a steam trap 39 being placed in line 38.

A valve 40 placed in line 37 serves to regulate the supply of steam to the first stage 6 of the generator.

Valve 40, preferably, is controlled in response to the temperature of liquid refrigerant leaving evaporator 4. A pneumatic control 42 regulates the supply of air to valve 40. The pressure of air imposed on valve 40 is varied by control 42 by means of a bulb 43 placed in contact with line 33, bulb 43 reflecting the temperature of chilled water leaving evaporator 4.

It will be appreciated the temperature of refrigerant leaving the evaporator serves to indicate the load imposed upon the system, hence control 42 actuates valve 40 to regulate the supply of steam to generator 6 in accordance with the load imposed upon the system.

While I have described steam employed as the heating medium for the first stage of the generator, it will be understood if desired a direct fired generator may be employed and in such case the fuel supply may be likewise regulated in response to the temperature of refrigerant leaving the evaporator.

As a safety control to prevent flooding of the first stage of the condenser by solution from the first stage of the generator when light loads are encountered, a float valve 45 is placed in the first stage 6 of the generator. Float valve 45 controls passage of solution through line 10 thus assuring that solution from the first stage of the generator does not flood the first stage of the condenser.

Considering operation of the system, weak solution is withdrawn from absorber 3 by pump 17 through line 18, the weak solution being forwarded through lines 19, 20 to the first stage 7 of the condenser where it is placed in heat exchange relation with refrigerant vapor boiled off in the first stage 6 of the generator. Passage of weak solution in heat exchange relation with refrigerant vapor in the condenser serves to preheat the solution prior to its passage to the first stage of the generator and at the same time serves to condense refrigerant vapor. The preheated weak solution then passes through line 21 to the first stage 6 of the generator. In the first stage 6 of the generator, refrigerant is boiled from the solution, the refrigerant vapor passing to the first stage 7 of the condenser. The solution then passes through line 10 to the second stage 9 of the generator.

In the second stage 9 of the generator, refrigerant in the solution is flashed, the vapor passing to the second stage 12 of the condenser. Refrigerant vapor in the second stage 12 is condensed by passing in heat exchange relation with cooling water. Vapor condensate leaves the second stage 12 of the condenser through line 30 and is returned through line 31 to the evaporator 4. Strong solution leaves the second stage 9 of the generator through line 13, being returned to the absorber through ejector 14 and line 15. As described above, vapor condensate leaves the stages 7 and 12 of the condenser through lines 29 and 30, returning through line 31 to evaporator 4. In evaporator 4 the refrigerant is flash-cooled, vapor passing downward about pan 4 to absorber 3 while the chilled water is withdrawn from the evaporator 4 through line 33 by pump 34 and supplied to a place of use, the water returning from the place of use to the evaporator through line 36.

The temperature of refrigerant leaving the evaporator serves to indicate the load imposed upon the system. As the temperature of water leaving the evaporator decreases, valve 40 is actuated to decrease the supply of steam to the first stage 6 of the generator thereby reducing the amount of work done by the system in accordance with the load imposed thereon. As a safety measure, float valve 45 is placed in the generator to prevent an increase in solution level above a desired point upon reduction of load imposed upon the system. Assuming the level of the solution in the first stage 6 of the generator increases beyond a desired point, float valve 45 permits the excess to pass through line 10 to the second stage 9 of the generator. If desired, such excess may pass directly to line 13 for return to the absorber 3.

In Figure 2, I have illustrated a modification of the invention. In the embodiment illustrated in Figure 2, a shell 50 contains a single stage generator 51 and a condenser 52. A solution coil 53 and a water cooling coil 54 are provided in the condenser 52. Weak solution passes from line 55 connected to the absorber through coil 53 in heat exchange relation with refrigerant in the condenser. The preheated solution leaves coil 53 through line 55 and passes to generator 51. Cooling water passes from line 56 through coil 54 in heat exchange relation with refrigerant in the condenser, leaving coil 54 through line 57. The remainder of the system is the same as the system described in connection with Figure 1.

The present invention provides an absorption refrigeration system including simple mechanism for preheating weak solution passing to the generator thereby assuring more economical and efficient operation of the system. In addition, the mechanism provided condenses refrigerant vapor in two stages thus reducing the quantity of condensing water necessary for use in the system. By preheating the weak solution prior to its passage to the generator the cost of operation of an absorption refrigeration system of this type is considerably reduced.

While I have described a preferred embodiment of the invention, it will be understood that the invention is not limited thereto, since it may be otherwise embodied within the scope of the following claims.

I claim:

1. In an absorption refrigeration system, the combination of an absorber, an evaporator, a generator, and a condenser, a heat exchange member in said condenser, and means for forwarding solution at its weakest from the absorber to the generator and for forwarding strong solution from the generator to the absorber, said means forwarding weak solution from the absorber through said heat exchange member condensing refrigerant vapor exteriorly of the heat exchange member in the condenser prior to the passage of weak solution to the generator.

2. In an absorption refrigeration system, the combination of an absorber, an evaporator, a generator and a condenser, means for passing strong solution from the generator to the absorber, a heat exchange member in the condenser, means including a line connecting the absorber with said member for passage of solution at its weakest through said member, a second line connecting said member with the generator to forward weak solution to the generator after its passage through said member, weak solution passing through said member in heat exchange relation with refrigerant vapor in the condenser to condense refrigerant vapor exteriorly of said heat exchange member and to preheat the weak solution prior to its passage to the generator.

3. An absorption refrigeration system according to claim 2 in which a second heat exchange member is provided in the condenser and means are provided to supply cooling water to said member in heat exchange relation with refrigerant in the condenser.

4. An absorption refrigeration system according to claim 3 in which means are provided to regulate passage of heating medium to the generator in response to the temperature of liquid refrigerant leaving the evaporator.

5. An absorption refrigeration system according to claim 4 in which control means are provided for regulating the level of solution in the generator.

6. In an absorption refrigeration system, the combination of an absorber, an evaporator, a first shell, a member in said first shell cooperating therewith to form the first stage of a generator, a second member in said first shell cooperating therewith to form the first stage of a condenser, a second shell forming the second stage of a generator, a member in said second shell cooperating therewith to form the second stage of a condenser, means for forwarding weak solution from the absorber to the generator and for forwarding strong solution from the generator to the absorber, said weak solution passing though the first stage of the condenser in heat exchange relation with refrigerant vapor in the condenser prior to its passage to the first stage of the generator.

7. An absorption refrigeration system according to claim 6 in which heating medium is passed in heat exchange relation with weak solution in the first stage of the generator, the second shell being maintained at a pressure different from the pressure of the first shell whereby solution passing from the first stage of the generator to the second stage of the generator is flashed, the flashed vapor passing to the second stage of the condenser, and means are provided for cooling the refrigerant vapor in the second stage of the condenser.

8. An absorption refrigeration system, according to claim 7, in which means are provided for returning vapor condensate from the first and second condenser stages to the evaporator.

9. An absorption refrigeration system according to claim 8 in which means are provided to regulate passage of heating medium to the first stage of the generator in response to the temperature of liquid refrigerant leaving the evaporator.

10. An absorption refrigeration system according to claim 9 in which a float valve is provided for regulating the level of solution in the generator.

11. In the method of operation of an absorption refrigeration system including an absorber, an evaporator, a generator, and a condenser, the steps which consist in passing weak solution from the absorber to the generator and strong solution from the generator to the absorber, passing weak solution from the absorber in heat exchange relation with refrigerant in the condenser prior to passage of the weak solution to the generator to pre-heat the same, and passing condensing water through the condenser in heat exchange relation with refrigerant vapor therein to condense the same.

12. In a method of operation of an absorption refrigeration system including an absorber, an evaporator, a two stage generator and a two stage condenser, the steps which consist in passing weak solution from the absorber to the first stage of the generator and strong solution from the second stage of the generator to the absorber, heating solution in the first stage of the generator to boil refrigerant vapor therefrom, passing weak solution from the absorber in heat exchange relation with refrigerant vapor in the first stage of the condenser to preheat the solution prior to its passage to the first stage of the generator thereby condensing the vapor, passing solution from the first stage of the generator to the second stage of the generator, boiling solution in the second stage of the generator, the refrigerant vapor from the second stage of the generator passing to the second stage of the condenser, passing a cooling medium in heat exchange relation with refrigerant vapor in the second stage of the condenser and returning vapor condensate from the first and second stages of the condenser to the evaporator.

13. A method of operation of an absorption refrigeration system according to claim 12 in which the supply of heating medium to the first stage of the generator is regulated in response to temperature of liquid refrigerant leaving the evaporator.

14. A method of operation of an absorption refrigeration system according to claim 13 in which the level of solution in the first stage of the generator is regulated to prevent flooding of the first stage of the condenser with solution.

References Cited in the file of this patent

UNITED STATES PATENTS

| | | |
|---|---|---|
| 1,960,809 | Dahlgren | May 29, 1934 |
| 2,019,290 | Brace | Oct. 29, 1935 |
| 2,049,664 | Rinaman | Aug. 4, 1936 |
| 2,055,191 | Zellhoefer | Sept. 22, 1936 |
| 2,064,040 | Smith | Dec. 15, 1936 |
| 2,123,708 | Brace | July 12, 1938 |
| 2,196,911 | Getaz | Apr. 9, 1940 |
| 2,273,108 | Hibberd | Feb. 17, 1942 |
| 2,284,691 | Strandberg | June 2, 1942 |
| 2,548,699 | Bernat | Apr. 10, 1951 |
| 2,550,429 | Reid | Apr. 24, 1951 |